(12) United States Patent
Ahmad

(10) Patent No.: US 10,253,826 B2
(45) Date of Patent: Apr. 9, 2019

(54) CLUTCH CONTROL MECHANISM FOR DUAL-BEARING REEL

(71) Applicant: Shimano Components (Malaysia) SDN. BHD., Pontian, Johor (MY)

(72) Inventor: Abu Supian Bin Ahmad, Johor (MY)

(73) Assignee: SHIMANO COMPONENTS (MALAYSIA) SDN. BHD., Johor (MY)

( * ) Notice: Subject to any disclaimer, the term of this patent is extended or adjusted under 35 U.S.C. 154(b) by 167 days.

(21) Appl. No.: 15/413,897

(22) Filed: Jan. 24, 2017

(65) Prior Publication Data

US 2017/0328421 A1 Nov. 16, 2017

(30) Foreign Application Priority Data

May 10, 2016 (JP) ................. 2016-094575

(51) Int. Cl.
| | |
|---|---|
| *A01K 89/01* | (2006.01) |
| *F16D 23/12* | (2006.01) |
| *A01K 89/015* | (2006.01) |
| *A01K 89/00* | (2006.01) |
| *A01K 89/0155* | (2006.01) |

(Continued)

(52) U.S. Cl.
CPC ............ *F16D 23/12* (2013.01); *A01K 89/006* (2013.01); *A01K 89/0155* (2013.01); *A01K 89/0185* (2015.05); *A01K 89/0189* (2015.05); *A01K 89/01901* (2015.05); *A01K 89/01912* (2015.05); *F16D 41/12* (2013.01); *F16H 25/18* (2013.01); *F16D 2023/123* (2013.01)

(58) Field of Classification Search
CPC .......... A01K 89/0189; A01K 89/01901; F16D 2023/123
See application file for complete search history.

(56) References Cited

U.S. PATENT DOCUMENTS 4,850,550 A * 7/1989 Aoki ................. A01K 89/01901
242/261
5,350,133 A * 9/1994 Morimoto ........ A01K 89/01901
242/261

(Continued)

FOREIGN PATENT DOCUMENTS

JP 2004154018 A 6/2004

*Primary Examiner* — Emmanuel M Marcelo
(74) *Attorney, Agent, or Firm* — United IP Counselors, LLC

(57) ABSTRACT

A clutch control mechanism configured to allow or block a transmission of a rotation of a handle to a spool in response to either a rotating of the handle or an operating of a clutch operating member. The clutch control mechanism includes a clutch cam, a clutch plate, and a positioning structure. The clutch cam is rotatably mounted to the reel unit, and is rotatable between a first position and a second position. The first position blocks the transmission of the rotation of the handle. The second position allows the transmission of the rotation of the handle. The clutch plate is coupled to the clutch operating member and to the clutch cam, and is unitarily rotatable with the clutch cam. The positioning structure to position the clutch cam from outside in a radial direction about a rotational axis of the clutch cam when the clutch cam is disposed in the first position.

11 Claims, 10 Drawing Sheets

(51) Int. Cl.
*F16D 41/12* (2006.01)
*F16H 25/18* (2006.01)

(56) References Cited

U.S. PATENT DOCUMENTS

| | | | | |
|---|---|---|---|---|
| 5,467,933 A * | 11/1995 | Miyazaki | A01K 89/0189 | 242/261 |
| 5,695,141 A * | 12/1997 | Sekimoto | A01K 89/01901 | 242/260 |
| 5,791,576 A * | 8/1998 | Miyazaki | A01K 89/0189 | 242/261 |
| 6,286,773 B1 * | 9/2001 | Ikuta | A01K 89/059 | 242/260 |
| 2012/0067993 A1 * | 3/2012 | Nakagawa | A01K 89/01901 | 242/257 |
| 2015/0181853 A1 * | 7/2015 | Niitsuma | A01K 89/015 | 242/257 |
| 2015/0327527 A1 * | 11/2015 | Ikebukuro | A01K 89/0192 | 242/264 |

* cited by examiner

CLUTCH CONTROL MECHANISM FOR DUAL-BEARING REEL

CROSS-REFERENCE TO RELATED APPLICATIONS

This application claims priority to Japanese Patent Application No. 2016-094575 filed on May 10, 2016, the entirety of which is hereby incorporated by reference in its entirety.

BACKGROUND

Technical Field

The present disclosure relates to a clutch control mechanism for a dual-bearing reel, and particularly to a clutch control mechanism for a dual-bearing reel, which allows or blocks a transmission of a rotation of a handle to a spool rotatably supported by a reel unit in response to either rotating the handle or operating a clutch operating member.

Background Information

A well-known type of dual-bearing reel has been proposed so far that includes a clutch control mechanism that allows or blocks a transmission of a rotation of a handle to a spool in response to either rotating the handle or operating a clutch operating member (see Japan Laid-open Patent Application Publication No. 2004-154018).

The clutch control mechanism for the well-known type of dual-bearing reel is provided with an anti-erroneous return mechanism (a positioning structure) for preventing erroneous return from a clutch-off state (a first position) to a clutch-on state (a second position) as described in Japan Laid-open Patent Application Publication No. 2004-154018 (see paragraph [0022] and FIGS. 3 and 4). The anti-erroneous return mechanism includes an engaging hole and an engaging pin. The engaging hole is provided in a return actuator piece, whereas the engaging pin is provided on a right frame of a reel unit. The engaging hole is an axially extending hole and is opened toward the right frame. The engaging pin is mounted to the right frame and is movable axially toward and away from the return actuator piece. In the clutch-off state, the tip end of the engaging pin is fit into the engaging hole. By thus axially fitting the engaging pin into the engaging hole, erroneous return from the clutch-off state to the clutch-on state is prevented.

As described above, in the anti-erroneous return mechanism of the well-known type of dual-bearing reel, erroneous return from the clutch-off state to the clutch-on state is prevented by axially fitting the engaging pin into the engaging hole. In this construction, when foreign objects (e.g., salt, sand, etc.) intrude into the engaging hole, it is difficult to appropriately fit the engaging pin into the engaging hole. This possibly results in occurrence of erroneous return from the clutch-off state to the clutch-on state.

BRIEF SUMMARY

The present disclosure has been produced in view of the aforementioned drawback. It is an object of the present disclosure to provide a clutch control mechanism for a dual-bearing reel whereby a clutch cam can be reliably prevented from rotating from a first position to a second position.

(1) A clutch control mechanism for a dual-bearing reel according to an aspect of the present disclosure allows or blocks a transmission of a rotation of a handle to a spool rotatably supported by a reel unit in response to either rotating the handle or operating a clutch operating member.

The clutch control mechanism includes a clutch cam, a clutch plate and a positioning structure. The clutch cam is mounted to the reel unit so as to be rotatable between a first position for blocking the transmission of the rotation of the handle and a second position for allowing the transmission of the rotation of the handle. The clutch plate is coupled to the clutch operating member, and is coupled to the clutch cam so as to be unitarily rotatable with the clutch cam. The positioning structure positions the clutch cam from outside in a radial direction about a rotational axis of the clutch cam when the clutch cam is disposed in the first position.

In the present clutch control mechanism, the positioning structure positions the clutch cam in the first position from outside in the radial direction. Therefore, in the present clutch control mechanism, the clutch cam can be reliably prevented from rotating from the first position to the second position in comparison with a well-known construction that positions the clutch cam in an axial direction.

(2) In a clutch control mechanism for a dual-bearing reel according to another aspect of the present disclosure, the positioning structure can include an engaging recess and an engaging protrusion. The engaging recess is provided on at least either of the clutch cam and the clutch plate. The engaging recess is opened in the radial direction. The engaging protrusion is provided outside the clutch cam in the radial direction. The engaging protrusion is engaged with the engaging recess when the clutch cam is disposed in the first position.

In this construction, the clutch cam is positioned in the first position by the positioning structure in which the engaging protrusion is engaged with the engaging recess from outside in the radial direction. Therefore, the clutch cam can be reliably prevented from rotating from the first position to the second position.

(3) In a clutch control mechanism for a dual-bearing reel according to yet another aspect of the present disclosure, the engaging protrusion can be moved along an outer peripheral surface of the either of the clutch cam and the clutch plate and be engaged with the engaging recess when the clutch cam is rotated from the second position to the first position. With this configuration, the engaging protrusion can be smoothly engaged with the engaging recess.

(4) In a clutch control mechanism for a dual-bearing reel according to further yet another aspect of the present disclosure, the engaging protrusion can be a tip end of a pin member. The pin member can be disposed such that an axis of the pin member is substantially orthogonal to the rotational axis. In this construction, the axis of the pin member is substantially orthogonal to the rotational axis of the clutch cam. Hence, the tip end of the pin member (i.e., the engaging protrusion) can be reliably engaged with the engaging recess.

(5) In a clutch control mechanism for a dual-bearing reel according to still further yet another aspect of the present disclosure, the positioning structure can include an urging member. The urging member urges the engaging protrusion inside in the radial direction. With this construction, the tip end of the pin member (i.e., the engaging protrusion) can be reliably engaged with the engaging recess.

Overall, according to the present disclosure, the clutch cam can be reliably prevented from rotating from the first position to the second position in the clutch control mechanism for a dual-bearing reel.

BRIEF DESCRIPTION OF THE DRAWINGS

Referring now to the attached drawings which form a part of this original disclosure.

DETAILED DESCRIPTION OF EMBODIMENTS

Figure 1:
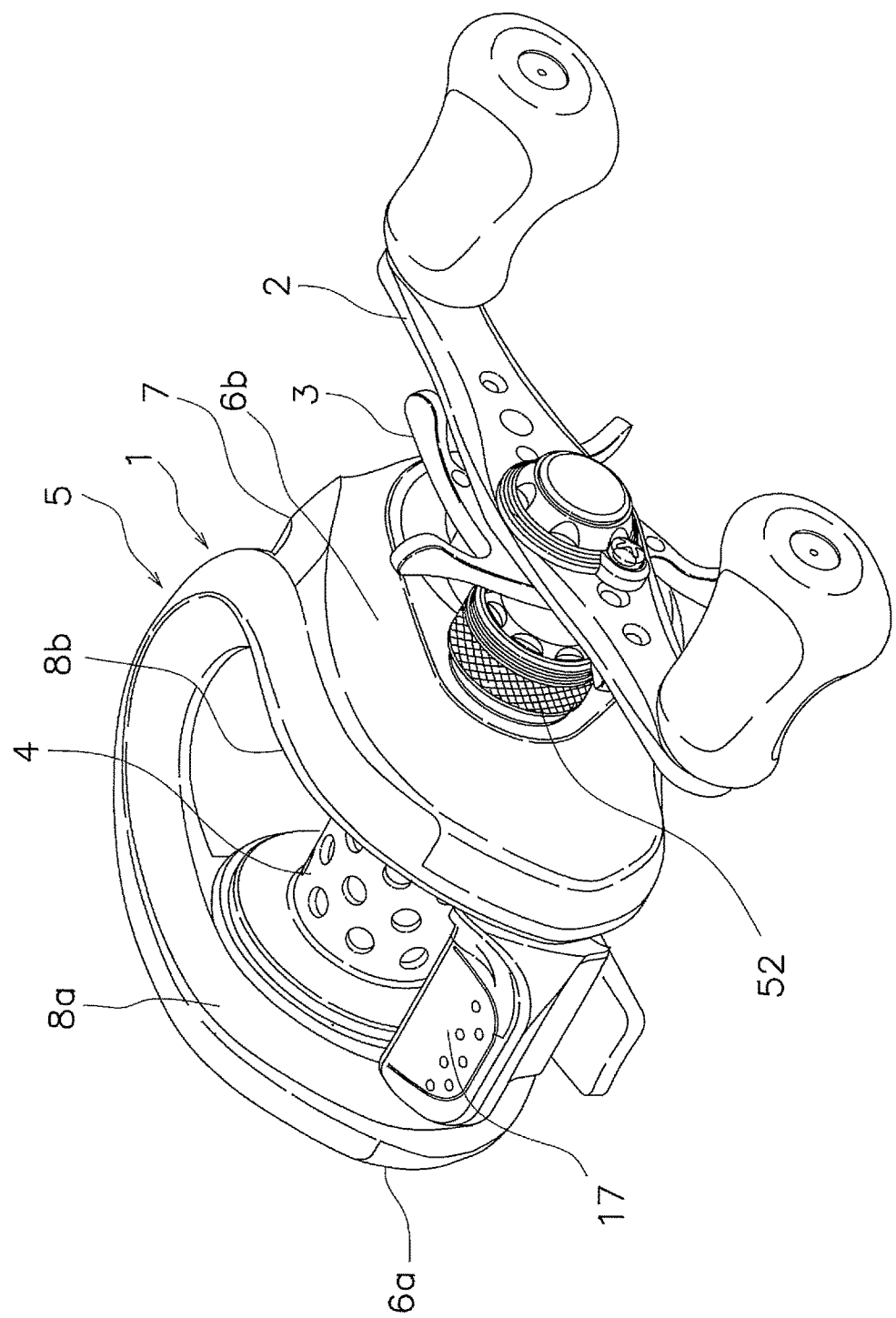
FIG. 1 is a perspective view of a dual-bearing reel employing a preferred embodiment of the present disclosure.

FIG. 1 shows a dual-bearing reel employing a preferred embodiment of the present disclosure. The dual-bearing reel includes a reel unit 1, a handle 2, a star drag 3 and a spool 4. The reel unit 1 is mountable to a fishing rod. The handle 2 is disposed alongside the reel unit 1. The star drag 3 is provided for drag adjustment and is disposed on the reel unit 1 side of the handle 2. The spool 4 is rotatably mounted to the reel unit 1. A clutch operating member 17 is mounted to the rear part of the reel unit 1.

<Construction of Reel Unit>

Figure 2:
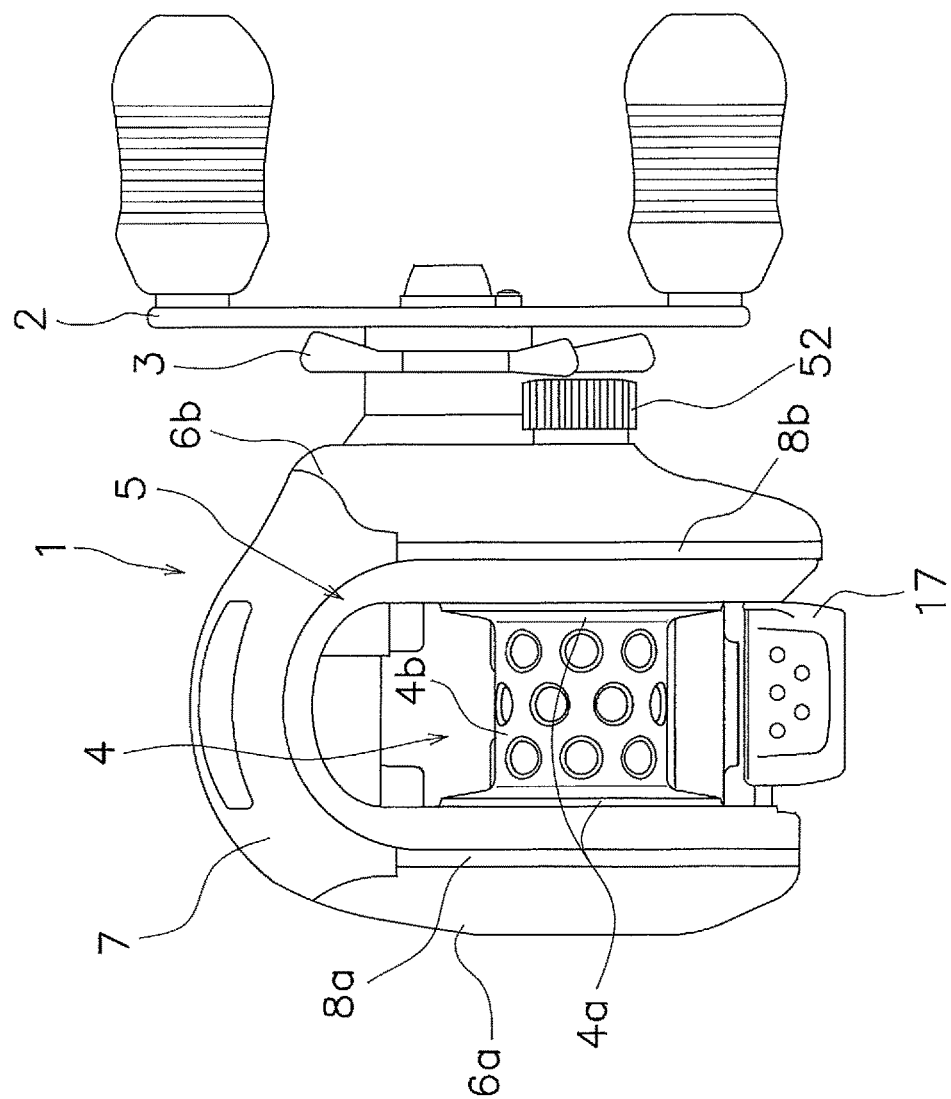
FIG. 2 is a plan view of the dual-bearing reel.

As shown in FIGS. 1 and 2, the reel unit 1 includes a frame 5, a first side cover 6a, a second side cover 6b, and a front cover 7 attached to the front side of the frame 5.

Figure 4:
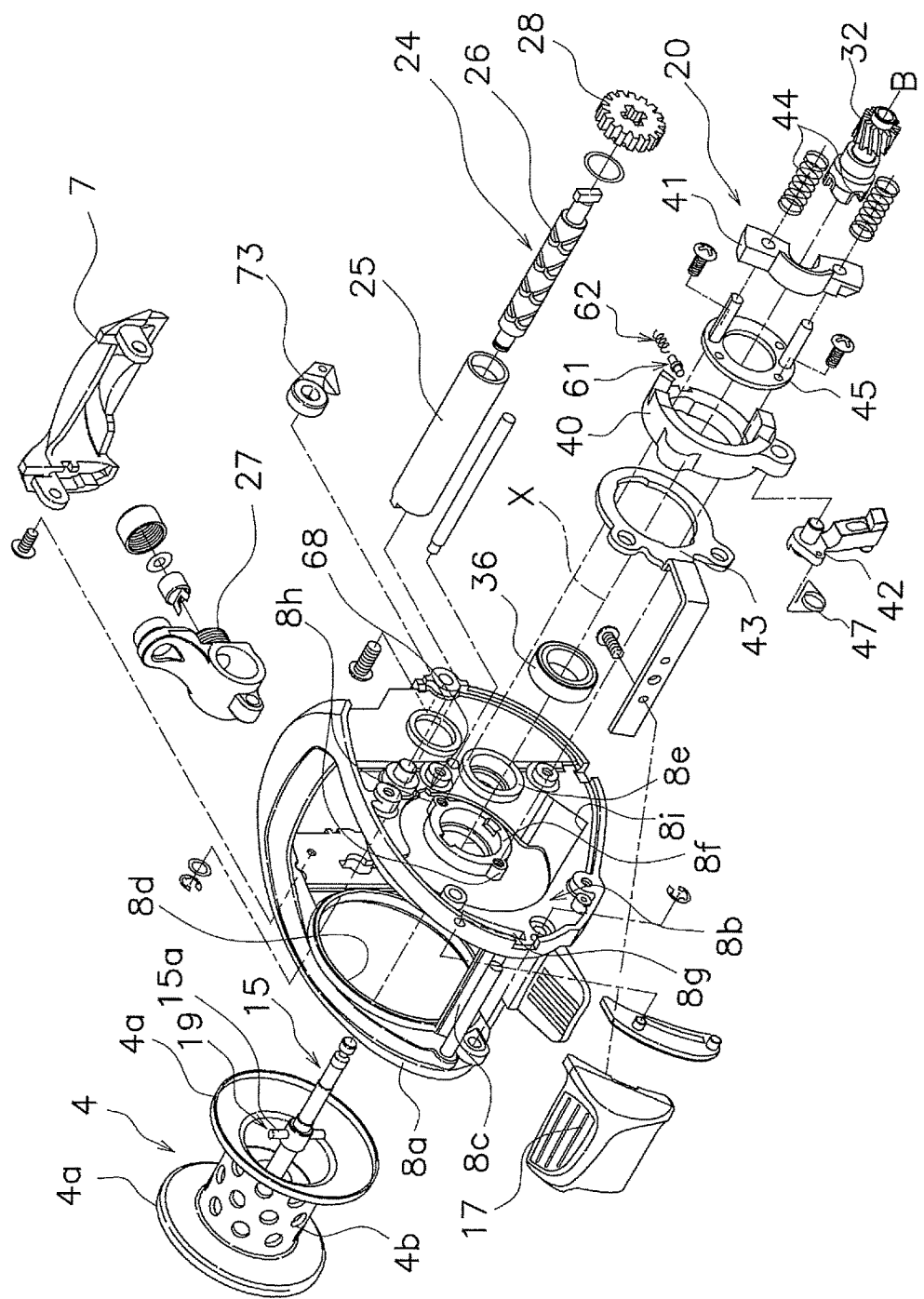
FIG. 4 is an exploded perspective view of a middle part of the dual-bearing reel.

As shown in FIGS. 2 and 4, the frame 5 includes a first side plate 8a, a second side plate 8b and a plurality of coupling portions 8c. The first side plate 8a and the second side plate 8b are disposed at a predetermined interval and are opposed to each other. The coupling portions 8c couple the first side plate 8a and the second side plate 8b.

As shown in FIG. 4, the first side plate 8a is an approximately plate-shaped member provided with an opening 8d. The opening 8d is a circular opening for taking out the spool 4. A bearing accommodation part (not shown in the drawings) is, for instance, screwed and fixed to the opening 8d. The second side plate 8b is an approximately plate-shaped member.

A clutch control mechanism 20 (to be described) and a rotation transmission mechanism 18 (to be described) are supported by the second side plate 8b. Additionally, a pin member 61 and a second coil spring 62 of a positioning structure 60 (to be described) are mounted to the second side plate 8b.

The second side plate 8b is provided with a first boss 8e and a second boss 8f. The first boss 8e supports the rotation transmission mechanism 18. When described in detail, the rotation transmission mechanism 18 is rotatably supported by the first boss 8e through a bearing 35. The bearing 35 is mounted to the first boss 8e provided on the second side plate 8b.

The second boss 8f supports the clutch control mechanism 20. When described in detail, the second boss 8f is provided with a pair of mount protrusions 8f on its outer peripheral part. The clutch control mechanism 20 is mounted to the pair of mount protrusions 8h.

As shown in FIG. 4, the second side plate 8b includes an accommodation portion 68 for accommodating the pin member 61 and the second coil spring 62 of the positioning structure 60. The accommodation portion 68 is mounted to the second side plate 8b.

Figure 6A:
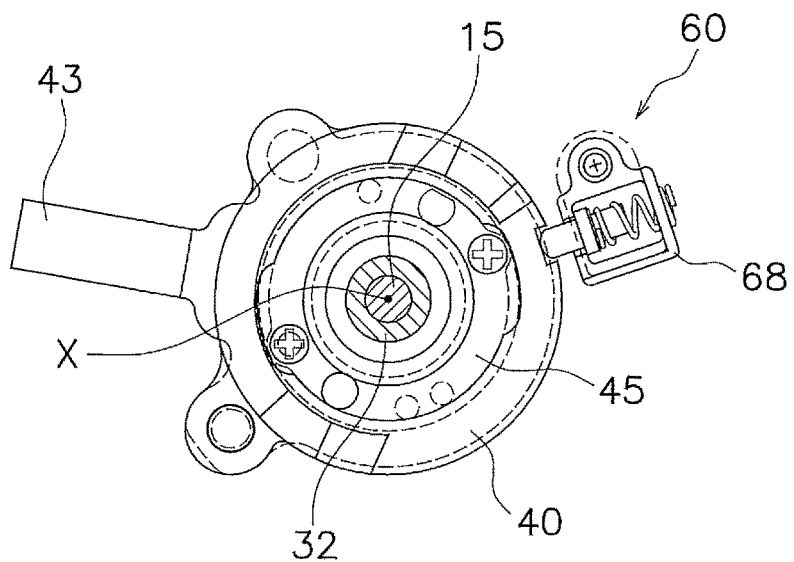
FIG. 6A is a side view of a positioning structure in a condition that a clutch cam is disposed in a decoupled position.
Figure 6B:
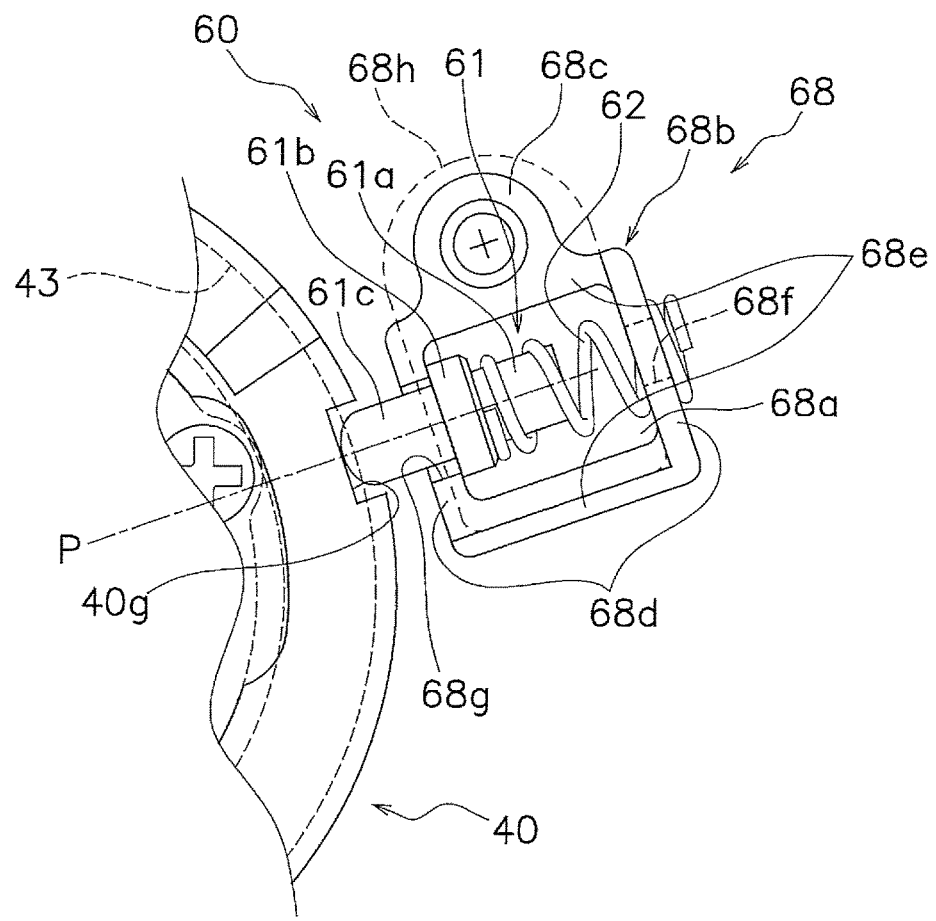
FIG. 6B is an enlarged side view of part of the positioning structure in the condition that the clutch cam is disposed in the decoupled position.

As shown in FIGS. 6A and 6B, the accommodation portion 68 composes part of the positioning structure 60. The accommodation portion 68 includes a bottom part 68a, a frame part 68b, a fixation part 68c and a lid part 68h. The bottom part 68a is composed of the outer lateral surface of the second side plate 8b.

The frame part 68b is a part accommodating the pin member 61 and the second coil spring 62. The frame part 68b is integrated with the bottom part 68a. The frame part 68b protrudes from the bottom part 68a toward the handle 2 in a direction along a spool shaft 15. It should be noted that a direction along a spool axis X can be hereinafter referred to as a spool shaft direction.

The frame part 68b includes a pair of first walls 68d and a pair of second walls 68e. The first walls 68d are opposed to each other in a radial direction about the spool axis X. The radially outer one of the pair of first walls 68d is provided with a second spring hook part 68f. For example, the second spring hook part 68f is a hole. One end of the second coil spring 62 is inserted through the second spring hook part 68f (a hole) and is hooked to the radially outer one of the first walls 68d.

The radially inner one of the pair of first walls 68d is provided with a recess 68g radially penetrating the radially inner one of the pair of first walls 68d. The base end of a head part 61c of the pin member 61 is disposed in the recess 68g. In this condition, the tip end of the head part 61c of the pin member 61 protrudes radially inside from the frame part 68b.

The second walls 68e are opposed to each other in a circumferential direction about the spool axis X. Each of the pair of second walls 68e is disposed at an interval from the pin member 61 and the second coil spring 62 in a direction orthogonal to the spool axis X.

The lid part 68h is fixed to the fixation part 68c. The fixation part 68c is integrated with the bottom part 68a and the frame part 68b. When described in detail, the fixation part 68c protrudes from the bottom part 68a toward the handle 2 in a direction along the spool shaft 15. Additionally, the fixation part 68c protrudes outward from the outer peripheral part of one of the second walls 68e.

The lid part 68h is a part for covering the pin member 61 and the second coil spring 62, both of which are accommodated in the frame part 68b. The lid part 68h is fixed to the fixation part 68c. When described in detail, a fixation member (e.g., a screw member) is inserted through a hole provided in the lid part 68h and is further screwed into female threads provided in the fixation part 68c, with the lid part 68h contacting the frame part 68b (the first walls 68d and the second walls 68e). As a result, the lid part 68h is fixed to the fixation part 68c.

Figure 3:
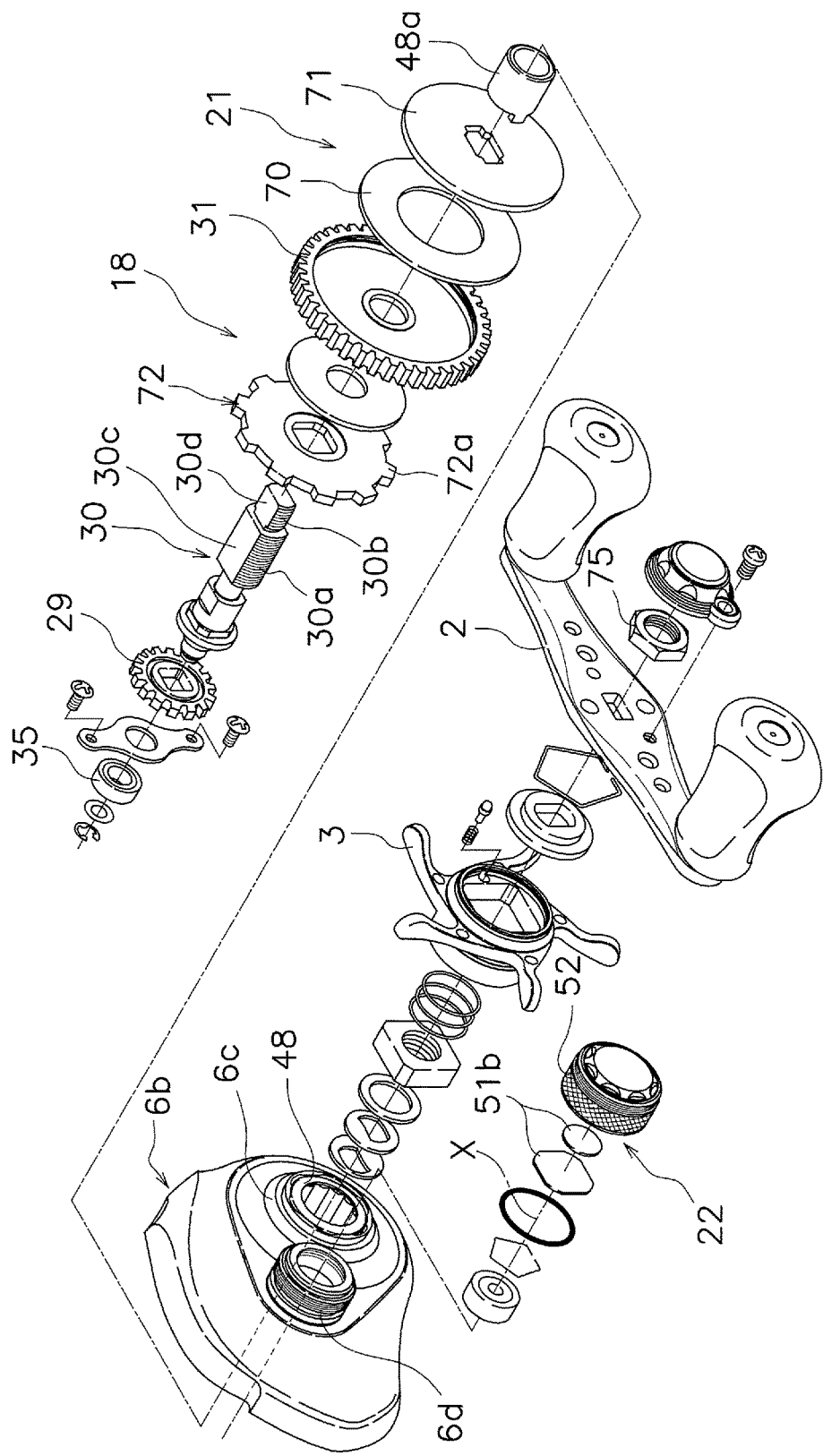
FIG. 3 is an exploded perspective view of a right-side part of the dual-bearing reel.

As shown in FIGS. 1 to 3, the first side cover 6a is mounted to the frame 6 so as to cover one lateral side of the frame 5. When described in detail, the first side cover 6a is capable of taking an opened or closed position with respect to the frame 5. The first side cover 6a is mounted to the frame 5 and can pivot so as to approach the frame 5 and separate from the frame 5.

The second side cover 6b is mounted to the frame 5 so as to cover the other lateral side of the frame 5. As shown in FIG. 3, the second side cover 6b is provided with a third boss 6c, a fourth boss 6d and so forth. The third boss 6c supports a handle shaft 30, whereas the fourth boss 6d supports the spool shaft 15.

The spool 4 (see FIG. 2), a level wind mechanism 24 (see FIG. 4), the clutch operating member 17 (see FIGS. 4 and 5) and a clutch mechanism 19 (see FIGS. 4 and 5) are mounted to the interior of the frame 5.

Additionally, the rotation transmission mechanism 18 (see FIG. 3), the clutch control mechanism 20 (see FIGS. 4 and 5), a drag mechanism 21 (see FIG. 3) and a casting control mechanism 22 (see FIG. 3) are mounted between the frame 5 and the second side cover 6b.

As shown in FIG. 2, the spool 4 is rotatably disposed between the first side plate 8a and the second side plate 8b. The spool 4 includes a pair of flanges 4a and a bobbin trunk 4b. The flanges 4a are provided on both side parts of the spool 4. The bobbin trunk 4b is provided between both flanges 4a. As shown in FIG. 4, the spool shaft 15 penetrates the center of the spool 4, and the spool 4 is fixed to the spool shaft 15.

The level wind mechanism 24 is provided for evenly winding the fishing line about the spool 4. As shown in FIG. 4, the level wind mechanism 24 includes a guide tube 25, a worm shaft 26, a line guide 27 and a driven gear 28. The guide tube 25 is fixed between the first side plate 8a and the second side plate 8b. The worm shaft 26 is rotatably supported by the guide tube 25 and is disposed in the guide tube 25. The driven gear 28 is mounted to an end of the worm shaft 26, and receives a rotation transmitted from the rotation transmission mechanism 18.

The casting control mechanism 22 is provided for regulating a resistive force applied during a rotation of the spool 4. As shown in FIG. 3, the casting control mechanism 22 includes a plurality of brake liners 51b and a cap 52. The brake liners 51b are disposed on both ends of the spool shaft 15. The cap 52 is provided for adjusting an abutting pressure of the brake liners 51b against the spool shaft 15. The cap 52 is mounted to the fourth boss 6d of the second side cover 6b.

The drag mechanism 21 is provided for braking the spool 4 in releasing the fishing line. As shown in FIG. 3, the drag mechanism 21 includes a friction plate 70 and a pressure plate 71. The friction plate 70 is rotatably mounted to the handle shaft 30. The friction plate 70 presses a master gear 31. The pressure plate 71 is mounted to the handle shaft 30 and is unitarily rotatable with the handle shaft 30. The pressure plate 71 presses the friction plate 70 onto the master gear 31 with a predetermined force in response to a rotational operation of the star drag 3. The pressure plate 71 is engaged with an inner race 48a of a one-way clutch 48 and is unitarily rotatable with the inner race 48a.

<Construction of Clutch Operating Member>

As shown in FIGS. 1 and 2, the clutch operating member 17 is disposed in a rear part of the frame 5, and is interposed between the first side plate 8a and the second side plate 8b. The clutch operating member 17 is also used as a thumb rest in thumbing the fishing line.

Figure 7:
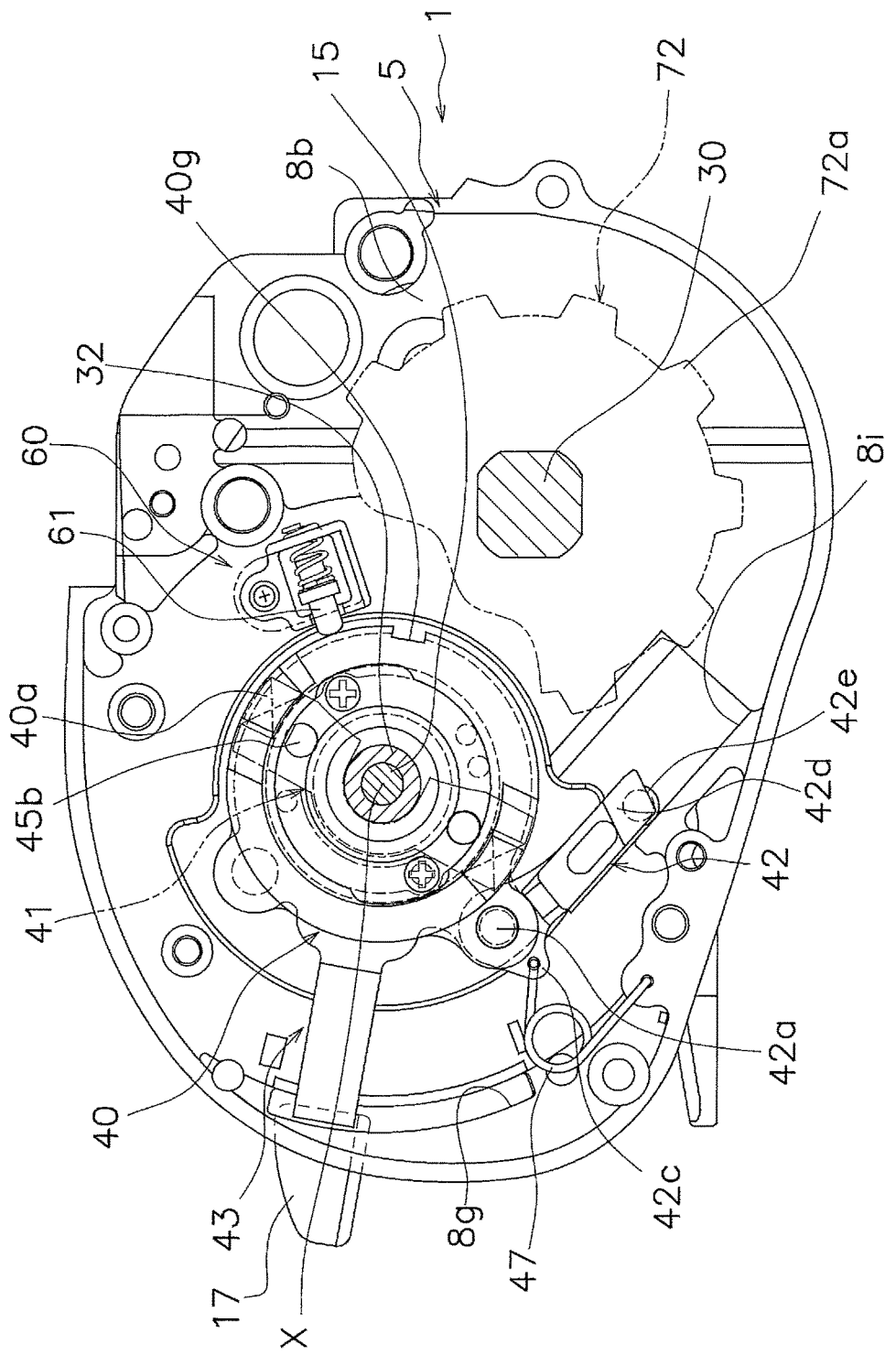
FIG. 7 is a side view of the clutch control mechanism in a condition that the clutch cam is disposed in a coupled position.
Figure 8:
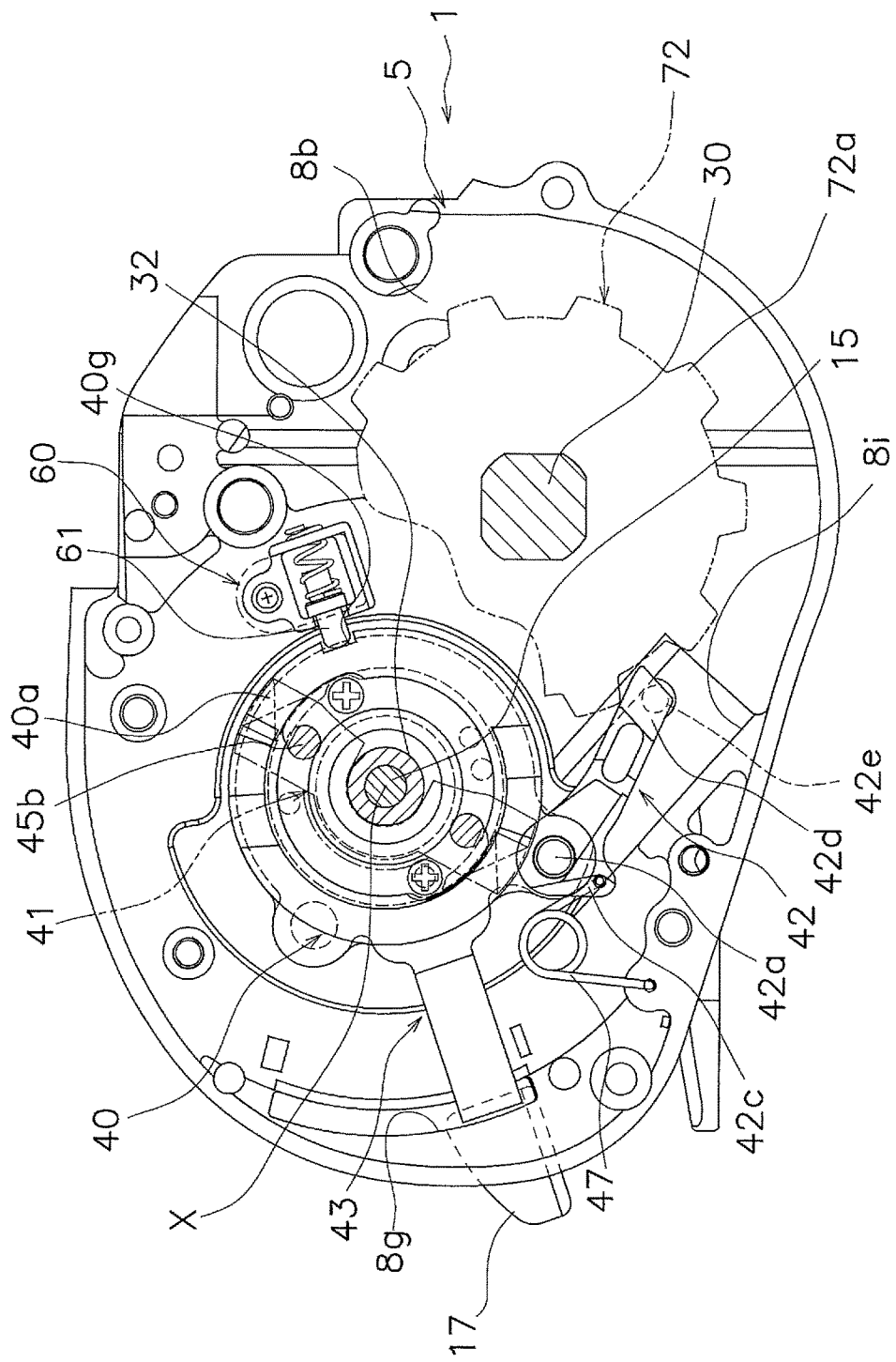
FIG. 8 is a side view of the clutch control mechanism in the condition that the clutch cam is disposed in the decoupled position.

The clutch operating member 17 is coupled to the clutch control mechanism 20 so as to be movable between a clutch-on position shown in FIG. 7 and a clutch-off position shown in FIG. 8.

<Construction of Rotation Transmission Mechanism>

The rotation transmission mechanism 18 is provided for transmitting a rotational force from the handle 2 to the spool 4 and the level wind mechanism 24.

As shown in FIGS. 3 and 4, the rotation transmission mechanism 18 includes the handle shaft 30, the master gear 31, a pinion gear 32 and a drive gear 29.

The handle shaft 30 is prevented from rotating in a fishing line releasing direction by the roller-type one-way clutch 48 accommodated in the third boss 6c of the second side cover 6b. Specifically, the pressure plate 71 is engaged with the inner race 48a of the one-way clutch 48 and the handle shaft 30, and is unitarily rotatable with the handle shaft 30. The inner race 48a of the one-way clutch 48 is rotatable only in a fishing line winding direction. With this configuration, the handle shaft 30 is prevented from rotating in the fishing line releasing direction.

Additionally, a ratchet wheel 72 is mounted to the handle shaft 30, and is unitarily rotatable with the handle shaft 30. The ratchet wheel 72 composes part of a clutch return mechanism 46 (to be described). Also, the ratchet wheel 72 functions not only as part of the clutch return mechanism 46 but also as a pawl-type one-way clutch that engages with a ratchet pawl 73 shown in FIG. 4.

Moreover, the handle shaft 30 is provided with a first threaded part 30a and a second threaded part 30b on its outer peripheral surface. The first threaded part 30a is a part onto which the star drag 3 is screwed. The second threaded part 30b is a small diameter part onto which a nut 75 is screwed for fixing the handle 2.

Furthermore, the handle shaft 30 is provided with a pair of first lock faces 30c and a pair of second lock faces 30d on its outer peripheral surface. The first lock faces 30c are parallel faces provided on the outer peripheral surface of the handle shaft 30. The first lock faces 30c are engaged with the pressure plate 71, the master gear 31 and the ratchet wheel 72, for instance, which are members mounted to the handle shaft 30 so as to be unitarily rotatable with the handle shaft 30. The second lock faces 30d are parallel faces provided on the outer peripheral surface of one end of the handle shaft 30. The second lock faces 30d are engaged with the handle 2.

The intermediate part of the handle shaft 30 is supported by the one-way clutch 48. The other end of the handle shaft 30 is rotatably supported by the bearing 35 mounted to the second side plate 8b. The bearing 35 is mounted to the first boss 8e provided on the second side plate 8b as shown in FIG. 4.

As shown in FIG. 3, the master gear 31 is rotatably mounted to the handle shaft 30. When described in detail, a rotation of the handle 2 is transmitted to the master gear 31 through the drag mechanism 21.

Figure 5:
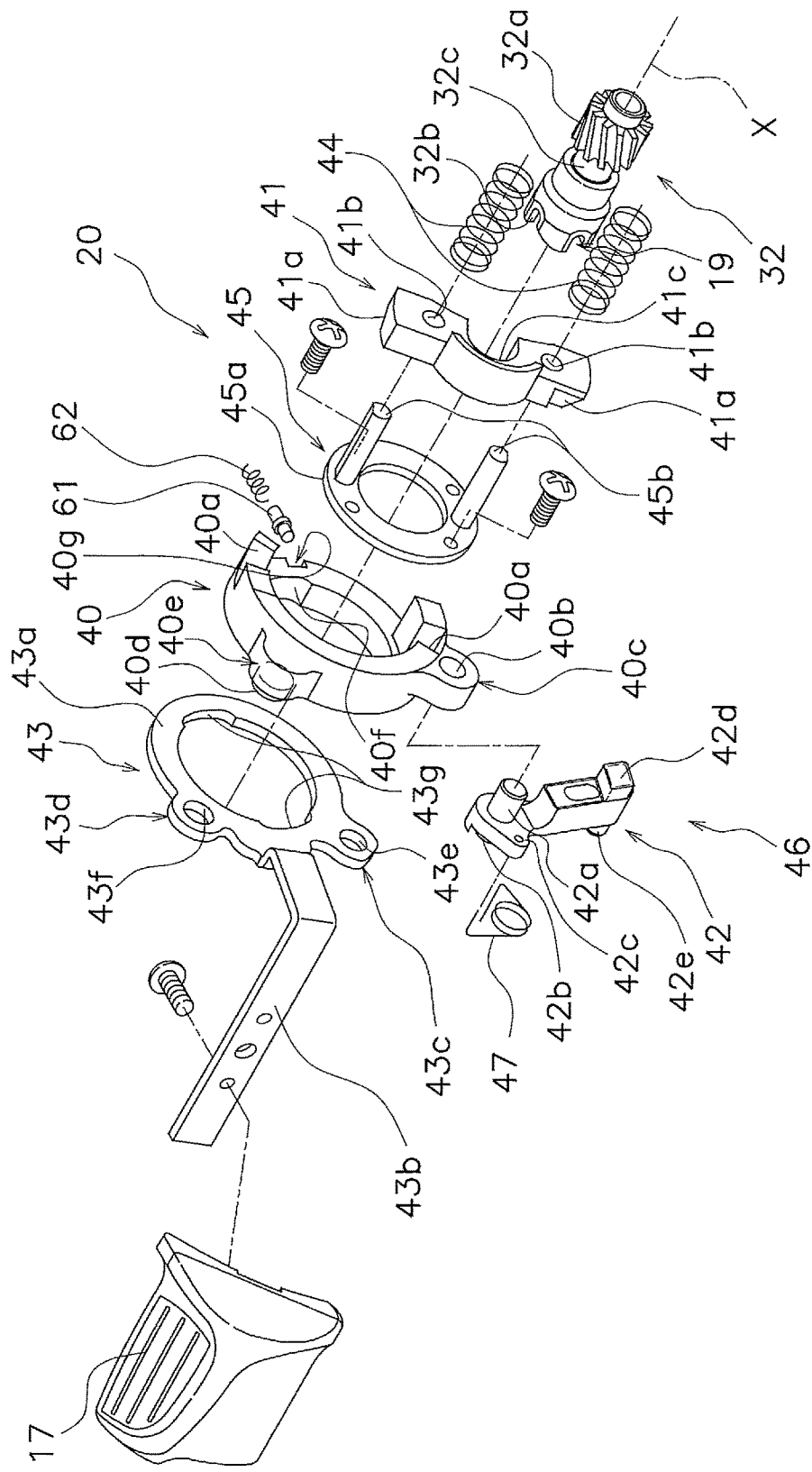
FIG. 5 is an exploded perspective view of a construction of a clutch control mechanism.

The pinion gear 32 is disposed on the outer peripheral side of the spool shaft 15. The pinion gear 32 is meshed with the master gear 31. As shown in FIG. 5, the pinion gear 32 includes a toothed part 32a, engaging grooves 32b and a small diameter part 32c. The toothed part 32a is provided on the outer peripheral part of one end of the pinion gear 32 so as to be meshed with the master gear 31.

The engaging grooves 32b are provided on the end surface of the other end of the pinion gear 32. The engaging grooves 32b can be engaged/disengaged with/from an engaging pin 15a (see FIG. 4) mounted to the spool shaft 15. A part, in which the engaging grooves 32b are provided, is rotatably supported at its outer peripheral surface by the second side plate 8b through a bearing 36. The bearing 36 is mounted to the second boss 8f of the second side plate 8b. The small-diameter part 32c is provided between the toothed part 32a and the engaging grooves 32b.

As shown in FIG. 3, the drive gear 29 is disposed at an interval from the master gear 31. The drive gear 29 is mounted to the handle shaft 30 and is unitarily rotatable with the handle shaft 30. The drive gear 29 is meshed with the driven gear 28 (see FIG. 4), and transmits a rotation of the handle 2 to the level wind mechanism 24.

<Construction of Clutch Mechanism>

The clutch mechanism 19 is composed of the engaging grooves 32b and the engaging pin 15a, which have been explained in relation to the rotation transmission mechanism 18. The clutch mechanism 19 is provided for coupling/decoupling the handle 2 and the spool 4 to/from each other. In other words, the clutch mechanism 19 is provided for allowing/blocking transmission of a rotational force between the handle 2 and the spool 4.

A clutch-on state (a rotation transmission allowed state) is defined as a state that the engaging grooves 32b and the engaging pin 15a are engaged in the clutch mechanism 19. In the clutch-on state, a rotational force is transmitted from the handle shaft 30 to the spool shaft 15. By contrast, a clutch-off state (a rotation transmission blocked state) is defined as a state that the engaging grooves 32b and the engaging pin 15a are disengaged from each other in the clutch mechanism 19. In the clutch-off state, the rotational force is not transmitted from the handle shaft 30 to the spool shaft 15.

<Construction of Clutch Control Mechanism>

The clutch control mechanism 20 allows or blocks a transmission of a rotation between the handle 2 and the spool 4 in response to rotating the handle 2. Additionally, the clutch control mechanism 20 allows or blocks a transmission of a rotation between the handle 2 and the spool 4 in response to operating the clutch operating member 17. When described in detail, the clutch control mechanism 20 controls the clutch mechanism 19 in response to either rotating the handle 2 or operating the clutch operating member 17.

As shown in FIGS. 4 and 5, the clutch control mechanism 20 includes a clutch cam 40, a clutch yoke 41, a guide member 45, a clutch plate 43, the clutch return mechanism 46 and the positioning structure 60.

(Construction of Clutch Cam)

The clutch cam 40 is rotated about the spool axis X when the clutch operating member 17 is operated. The clutch cam 40 has a substantially cylindrical shape. As shown in FIGS. 7 and 8, the clutch cam 40 is mounted to the second boss 8f of the second side plate 8b and is rotatable about the spool axis X.

The clutch cam 40 is mounted to the reel unit 1 and is rotatable between a decoupled position (see FIG. 8) and a coupled position (see FIG. 7). The decoupled position is an exemplary first position and corresponds to the clutch-off state. The coupled position is an exemplary second position and corresponds to the clutch-on state.

When the clutch cam 40 is set in the decoupled position, a transmission of a rotation of the handle 2 to the spool 4, i.e., a transmission of a rotation of the handle shaft 30 to the spool shaft 15 is blocked. By contrast, when the clutch cam 40 is set in the coupled position, a transmission of a rotation of the handle 2 to the spool 4, i.e., a transmission of a rotation of the handle shaft 30 to the spool shaft 15 is allowed.

As shown in FIG. 5, the clutch cam 40 includes a pair of cam faces 40a, a first joint part 40c, a second joint part 40e, a pair of relief parts 40f and an engaging recess 40g. The cam faces 40a are provided on the outer lateral surface (the right lateral surface in FIG. 5) of the clutch cam 40. Each cam face 40a is a slope for outwardly pressing the clutch yoke 41 in the spool shaft direction.

The first joint part 40c is provided on the outer peripheral part of the clutch cam 40. When described in detail, the first joint part 40c protrudes radially outward from the outer peripheral part of the clutch cam 40. The first joint part 40c is provided with a joint hole 40b. The joint hole 40b is provided for supporting a clutch pawl 42 (to be described) such that the clutch pawl 42 is rotatable. The joint hole 40b penetrates the first joint part 40c in a direction along the spool axis X.

The second joint part 40e is disposed at an interval from the first joint part 40c in the circumferential direction. The second joint part 40e is provided on the outer peripheral part of the clutch cam 40. When described in detail, the second joint part 40e protrudes radially outward from the outer peripheral part of the clutch cam 40. The second joint part 40e is provided with a joint protrusion 40d. The joint protrusion 40d is provided for unitarily rotating the clutch cam 40 with the clutch plate 43. The joint protrusion 40d protrudes toward the clutch plate 43 (e.g., a cam joint hole 43f to be described) in the spool shaft direction.

The pair of relief parts 40f is provided on the inner peripheral surface of the clutch cam 40. When described in detail, the relief parts 40f are recessed in a circular-arc shape and are located in radial opposition to each other. The pair of mount protrusions 8h (see FIG. 4) provided on the second side plate 8b is disposed in the pair of relief parts 40f, respectively.

The clutch cam 40 is rotatable within a predetermined range corresponding to a moving range of each mount protrusion 8h between circumferentially opposed ends in each relief part 40f. In other words, the relief parts 40f restrict rotation of the clutch cam 40 to the predetermined range.

The engaging recess 40g composes part of the positioning structure 60. The engaging recess 40g is provided on the outer peripheral part of the clutch cam 40. When described in detail, the engaging recess 40g is provided on the outer peripheral part of the clutch cam 40 and is opened radially outside. The pin member 61 (e.g., its head part 61c) can engage with the engaging recess 40g. Specifically, when the clutch cam 40 is disposed in the decoupled position, the head part 61c of the pin member 61 is engaged with the engaging recess 40g. On the other hand, when the clutch cam 40 is disposed in a different position from the decoupled position, the head part 61c of the pin member 61 is disengaged from the engaging recess 40g and contacts the outer peripheral surface of the clutch cam 40.

(Construction of Clutch Yoke and Guide Member)

The clutch yoke 41 is provided for moving the pinion gear 32 in the spool shaft direction in accordance with rotation of the clutch cam 40. The clutch yoke 41 is engaged with the clutch cam 40.

As shown in FIG. 5, the clutch yoke 41 includes a pair of cam receiving parts 41a, a pair of guide holes 41b and an engaging groove 41c.

The pair of cam receiving parts 41a is engaged with the pair of cam faces 40a of the clutch cam 40, respectively. When the pair of cam receiving parts 41a is engaged with the pair of cam faces 40a of the clutch cam 40, the clutch yoke 41 is pressed in the spool shaft direction. Accordingly, the clutch yoke 41 is guided by the guide member 45 in the spool shaft direction.

The pair of guide holes 41b is provided for guiding the clutch yoke 41 in the spool shaft direction. The guide holes 41b penetrate the clutch yoke 41 in the spool shaft direction.

The guide member 45 includes a fixation part 45a having an annular disc shape and a pair of guide shafts 45b. The fixation part 45a is screwed to the mount protrusions 8h (see FIG. 4) of the second boss 8f provided on the second side plate 8b. The pair of guide shafts 45b stands upright on the fixation part 45a. When described in detail, the pair of guide shafts 45b extends in the spool shaft direction. The pair of guide shafts 45b is inserted through the pair of guide holes 41b of the clutch yoke 41, respectively.

The engaging groove 41c is engaged with the small-diameter part 32c of the pinion gear 32. The engaging groove 41c has a semicircular shape. The engaging groove 41c is provided in the center part of the clutch yoke 41. With the construction that the engaging groove 41c is engaged with the small-diameter part 32c of the pinion gear 32, the pinion gear 32 is moved in the spool shaft direction in conjunction with movement of the clutch yoke 41.

Additionally, the clutch yoke 41 is urged in the spool shaft direction (leftward in FIG. 5) by first coil springs 44. Each first coil spring 44 is disposed on the outer peripheral side of each guide shaft 45b. The first coil springs 44 are disposed in a compressed state and are interposed between the inner lateral surface of the second side cover 6b and the outer lateral surface of the clutch yoke 41.

(Construction of Clutch Plate)

As shown in FIGS. 4 and 5, the clutch plate 43 rotates the clutch cam 40 in response to operating the clutch operating member 17. The clutch operating member 17 is coupled to the clutch plate 43. The clutch plate 43 is coupled to the clutch cam 40 so as to be unitarily rotatable with the clutch cam 40. The clutch plate 43 is disposed between the clutch cam 40 and the second side plate 8b.

The clutch plate 43 includes a mount part 43a, an operating member fixing part 43b, a first protrusion 43c and a second protrusion 43d.

The mount part 43a is rotatably mounted to the second boss 8f of the second side plate 8b. When described in detail, as shown in FIG. 4, the mount part 43a is disposed axially between the outer lateral surface of the second side plate 8b and the clutch cam 40, and is disposed about the second boss 8f. As shown in FIG. 5, the mount part 43a is provided with relief parts 43g on its inner peripheral surface. Similarly to each relief part 40f of the clutch cam 40, each relief part 43g is recessed in a circular-arc shape so as to dispose on each relief part 43g each mount protrusion 8h.

As shown in FIG. 5, the operating member fixing part 43b is provided on the outer peripheral part of the mount part 43a. When described in detail, the operating member fixing part 43b radially extends from the mount part 43a and is then bent along the spool shaft direction. The clutch operating member 17 is fixed to the bent part of the operating member fixing part 43b by a fixation member (e.g., a screw member). The operating member fixing part 43b protrudes toward the inner lateral surface of the first side plate 8a while passing through a slit 8g (see FIG. 4). The slit 8g is provided in the rear part of the second side plate 8b and has a circular-arc shape.

The first protrusion 43c extends in a radial direction so as to be opposed to the first joint part 40c of the clutch cam 40 in the spool shaft direction. A base end of the clutch pawl 42 to be described is disposed between the first protrusion 43c and the first joint part 40c. The first protrusion 43c is provided with a pawl joint hole 43e. The base end of the clutch pawl 42 is joined to the pawl joint hole 43e.

The second protrusion 43d extends in a radial direction so as to be opposed to the second joint part 40e of the clutch cam 40 in the spool shaft direction. The second protrusion 43d is provided with the cam joint hole 43f. The joint protrusion 40d of the clutch cam 40 is joined to the cam joint hole 43f.

(Construction of Clutch Return Mechanism)

The clutch return mechanism 46 is provided for returning the clutch mechanism 19 from the clutch-off state to the clutch-on state in conjunction with the handle 2 being rotated in the fishing-line winding direction.

As shown in FIG. 5, the clutch return mechanism 46 includes the ratchet wheel 72 (see FIG. 3), the clutch pawl 42 and a toggle spring member 47.

The ratchet wheel 72 is mounted to the handle shaft 30 so as to be unitarily rotatable with the handle shaft 30. As described above, the ratchet wheel 72 also functions as a one-way clutch to prevent the handle shaft 30 from rotating in the fishing line releasing direction. The ratchet wheel 72 is non-rotatably mounted to the handle shaft 30. As described in FIG. 3, the ratchet wheel 72 is provided with a large number of teeth 72a on an outer peripheral part of the ratchet wheel 72. The teeth 72a are aligned at intervals in the rotational direction of the ratchet wheel 72.

As shown in FIG. 5, the clutch pawl 42 is joined to the clutch cam 40. When described in detail, the clutch pawl 42 is joined to the clutch cam 40 and the clutch plate 43. The clutch pawl 42 includes a first joint protrusion 42a, a second joint protrusion 42b and a first spring hook part 42c. Additionally, the clutch pawl 42 includes a pressure receiver 42d and a guide protrusion 42e.

The first joint protrusion 42a is provided on the base end of the clutch pawl 42 (the upper end in FIG. 5). The first joint protrusion 42a has a columnar shape and protrudes toward the clutch cam 40. The first joint protrusion 42a is fit into the joint hole 40b of the clutch cam 40.

The second joint protrusion 42b is provided on the base end (the upper end in FIG. 5) of the clutch pawl 42. The second joint protrusion 42b has a columnar shape and protrudes toward the clutch plate 43. The second joint protrusion 42b is disposed coaxially to the first joint protrusion 42a. The second joint protrusion 42b is fit into the pawl joint hole 43e of the clutch plate 43.

As shown in FIGS. 7 and 8, with this construction, the clutch pawl 42 is rotatable with respect to the clutch cam 40 and the clutch plate 43 and is interposed between the clutch cam 40 and the clutch plate 43.

The first spring hook part 42c is provided in the base end (the upper end in FIG. 5) of the clutch pawl 42. The toggle spring member 47 is attached to the first spring hook part 42c. For example, the toggle spring member 47 can be a torsion coil spring. One end of the toggle spring member 47 is hooked to the first spring hook part 42c. The other end of the toggle spring member 47 is hooked to the outer peripheral surface of the second side plate 8b.

The clutch pawl 42 is can change its posture from a disengaged position to an engaged position in conjunction with rotation of the clutch cam 40. When set in the disengaged position (see FIG. 7), the clutch pawl 42 is disengaged from the ratchet wheel 72. By contrast, when set in the engaged position (see FIG. 8), the clutch pawl 42 is engaged with the ratchet wheel 72. The toggle spring member 47 urges the clutch pawl 42 toward either the disengaged position or the engaged position. In other words, the toggle spring member 47 urges the clutch cam 40 and the clutch plate 43 toward either the coupled position or the decoupled position through the clutch pawl 42.

The pressure receiver 42d is provided on the tip end (the lower end in FIG. 5) of the clutch pawl 42. The pressure receiver 42d protrudes outward in the spool shaft direction. The pressure receiver 42d is pressed by the ratchet wheel 72 rotating in the fishing line winding direction.

The guide protrusion 42e is provided on the tip end (the lower end in FIG. 5) of the clutch pawl 42. The guide protrusion 42e protrudes toward a guide recess 8i. The guide recess 8i is recessed on the outer peripheral surface of the second side plate 8b. The guide protrusion 42e guides the tip end of the clutch pawl 42 to the vicinity of the ratchet wheel 72, and is guided by the guide recess 8i. The clutch pawl 42 is positioned in either the disengaged position or the engaged position by the urging force of the toggle spring member 47, and is guided at its guide protrusion 42e by the guide recess 8i.

In the aforementioned clutch return mechanism 46, the clutch operating member 17 is disposed in the clutch-on position as shown in FIG. 7, when the engaging pin 15a of the spool shaft 15 is engaged with the engaging grooves 32b of the pinion gear 32 in the clutch mechanism 19. The clutch pawl 42 is disposed in the disengaged position. In other words, when the clutch mechanism 19 is set in the clutch-on state, the clutch pawl 42 is disposed in the disengaged position.

When the clutch operating member 17 is operated and shifted from the clutch-on position to the clutch-off position as shown in FIGS. 7 and 8, the engaging pin 15a of the spool shaft 15 is disengaged from the engaging grooves 32b of the pinion gear 32 in the clutch mechanism 19. Accordingly, as shown in FIG. 8, the clutch pawl 42 is disposed in the engaged position. In other words, when the clutch mechanism 19 is set in the clutch-off state, the clutch pawl 42 is disposed in the engaged position.

Thus, when the clutch pawl 42 is moved from the disengaged position to the engaged position in response to operating the clutch operating member 17, the clutch cam 40 and the clutch plate 43, both of which are joined to the clutch pawl 42, are rotated from the coupled position to the decoupled position. Accordingly, the clutch mechanism 19 is changed from the clutch-on state to the clutch-off state.

In this condition, when the handle 2 is operated and rotated in the fishing line winding direction, the ratchet wheel 72 is rotated in the fishing line winding direction. Accordingly, the teeth 72a of the ratchet wheel 72 press the pressure receiver 42d of the clutch pawl 42. When herein getting across a dead center position of the toggle spring member 47, the clutch pawl 42 is urged to the disengaged position.

Thus, when the clutch pawl 42 is moved from the engaged position to the disengaged position in response to operating the handle 2, the clutch cam 40 and the clutch plate 43, both of which are joined to the clutch pawl 42, are returned from the decoupled position to the coupled position. Accordingly, the clutch mechanism 19 is returned from the clutch-off state to the clutch-on state. At this time, the clutch operating member 17 is also returned from the clutch-off position to the clutch-on position.

(Construction of Positioning Structure)

When the clutch cam 40 is disposed in the decoupled position, the positioning structure 60 positions the clutch cam 40 from outside in a radial direction about the rotational axis of the clutch cam 40. The rotational axis of the clutch cam 40 herein overlaps with the spool axis X. Hence, the rotational axis of the clutch cam 40 will be hereinafter denoted by reference sign X on an as-needed basis.

As shown in FIGS. 6A and 6B, the positioning structure 60 includes the accommodation portion 68, the engaging recess 40g, the pin member 61 and the second coil spring 62 (an exemplary urging member). It should be noted that FIGS. 6A and 6B show a condition of the clutch cam 40 disposed in the decoupled position.

As described above, the accommodation portion 68 is mounted to the reel unit 1. When described in detail, the accommodation portion 68 is mounted to the frame 5 (e.g., the second side plate 8b). The accommodation portion 68 has been already explained in relation to the reel unit 1, and will not be hereinafter explained in detail.

As described above, the engaging recess 40g is provided on the outer peripheral part of the clutch cam 40. When described in detail, the engaging recess 40g is a groove extending in the spool shaft direction and is opened in the radial direction. The engaging recess 40g is herein exemplified as the groove extending in the spool shaft direction. However, the engaging recess 40g can be a hole recessed toward the spool axis X (the rotational axis X of the clutch cam 40).

The pin member 61 is disposed radially outside the clutch cam 40. For example, part of the pin member 61 is accommodated in the accommodation portion 68. When described in detail, part of the pin member 61 is accommodated in the accommodation portion 68 such that an axis P of the pin member 61 is arranged substantially orthogonal to the rotational axis X of the clutch cam 40. The tip end of the pin member 61 is disposed outside the accommodation portion 68. Additionally, when the clutch cam 40 is disposed in the decoupled position, the tip end of the pin member 61 is engaged with the engaging recess 40g.

Specifically, the pin member 61 includes a shaft part 61a, a large diameter part 61b and the head part 61c (an exemplary engaging protrusion). The shaft part 61a is elongated in one direction and has a columnar shape. The shaft part 61a is disposed inside the accommodation portion 68. One end (the tip end) of the shaft part 61a is disposed at an interval from the radially outer one of the first walls 68d of the frame part 68b. The other end (the base end) of the shaft part 61a is provided with the large diameter part 61b.

The large diameter part 61b is integrated with the base end of the shaft part 61a and has a columnar shape. The large diameter part 61b has a larger diameter than the base end of the shaft part 61a. The large diameter part 61b is disposed inside the accommodation portion 68. The large diameter part 61b is disposed in opposition to the radially inner one of the first walls 68d of the frame part 68b (see FIGS. 7 and 8). Additionally, the second coil spring 62 is disposed between the large diameter part 61b and the radially outer one of the first walls 68d of the frame part 68b.

The head part 61c is integrated with the large diameter part 61b. When described in detail, the head part 61c has a substantially columnar shape. The head part 61c protrudes from the large diameter part 61b in the extending direction of the axis P of the shaft part 61a. The base end of the head part 61c is integrated with the large diameter part 61b. The base end of the head part 61c is disposed in the recess 68g of the frame part 68b.

In the head part 61c, the tip end is integrated with the base end. The tip end of the head part 61c has a substantially hemispherical shape. The tip end of the head part 61c is disposed on the radially inner side of the frame part 68b. In other words, the tip end of the head part 61c protrudes radially inward from the frame part 68b.

The tip end of the head part 61c is disposed on the radially outer side of the clutch cam 40 so as to be contactable to the outer peripheral part of the clutch cam 40. When described in detail, the tip end of the head part 61c contacts the outer peripheral surface of the clutch cam 40 in the condition that the clutch cam 40 is disposed in the coupled position as shown in FIG. 7.

On the other hand, the tip of the head part 61c is engaged with the engaging recess 40g in the condition that the clutch cam 40 is disposed in the decoupled position as shown in FIG. 8. Specifically, the tip end of the head part 61c contacts the bottom of the engaging recess 40g. In this condition, a gap is produced between the large diameter part 61b and the radially inner one of the first walls 68d of the frame part 68b.

It should be noted that the large diameter part 61b can contact the radially inner one of the first walls 68d of the frame part 68b as long as the head part 61c can be engaged with the engaging recess 40g.

As shown in FIG. 6B, the second coil spring 62 urges the pin member 61 radially inward. The second coil spring 62 is disposed between the frame part 68b and the large diameter part 61b of the pin member 61. When described in detail, the second coil spring 62 is compressed and is disposed between the radially outer one of the first walls 68d of the frame part 68b and the large diameter part 61b of the pin member 61.

The shaft part 61a of the pin member 61 is disposed inside the inner peripheral part of the second coil spring 62. One end of the second coil spring 62 is hooked to the radially outer one of the first walls 68d of the frame part 68b (e.g., the second spring hook part 68f of the radially outer one of the first walls 68d). The other end of the second coil spring 62 contacts the large diameter part 61b.

The second coil spring 62 is herein compressed and is disposed between the radially outer one of the first walls 68d of the frame part 68b and the large diameter part 61b of the pin member 61. Therefore, the pin member 61 is constantly urged radially inward by the second coil spring 62.

<Action of Dual-Bearing Reel>

In a normal condition, as shown in FIG. 7, the clutch operating member 17 is disposed in the clutch-on position. The clutch yoke 41 is herein pressed inward in the spool shaft direction by the first coil springs 44. On the other hand, the engaging pin 15a of the spool shaft 15 and the engaging grooves 32b of the pinion gear 32 are engaged with each other. In other words, this is the clutch-on state of the clutch mechanism 19.

In the clutch-on state, a rotational force from the handle 2 is transmitted to the spool shaft 15 and the spool 4 through the handle shaft 30, the master gear 31, and the pinion gear 32. At this time, a resistive force applied during a rotation of the spool 4 can be adjusted by adjusting the fastening amount of the cap 52 of the casting control mechanism 22.

In the clutch-on state, the tip end of the head part 61c of the pin member 61 contacts the outer peripheral surface of the clutch cam 40. In this condition, the large diameter part 61b of the pin member 61 is disposed away from the radially inner one of the first walls 68d of the frame part 68b. In other words, the tip end of the head part 61c of the pin member 61 contacts the outer peripheral surface of the clutch cam 40, while the pin member 61 is urged radially inward by the second coil spring 62.

In this condition, when the clutch operating member 17 is pressed downward, as shown in FIG. 8, the clutch operating member 17 is downwardly rotated about the spool axis X and is moved from the clutch-on position to the clutch-off position.

The clutch operating member 17 and the clutch plate 43 are herein coupled to each other. Hence, when the clutch operating member 17 is rotated downward, the clutch plate 43 and the clutch cam 40 are rotated about the spool axis X in the counterclockwise direction. Accordingly, the clutch cam 40 is rotated from the coupled position to the decoupled position.

Thus, when the clutch cam 40 is rotated from the coupled position to the decoupled position, the tip end of the head part 61c of the pin member 61 is moved along the outer peripheral surface of the clutch cam 40 while making contact with the clutch cam 40. When the clutch cam 40 then reaches the decoupled position, the tip end of the head part 61c of the pin member 61 is engaged with the engaging recess 40g. In other words, the clutch cam 40 is positioned in the decoupled position by the positioning structure 60.

When the clutch cam 40 is rotated from the coupled position to the decoupled position, the clutch yoke 41 is, on the other hand, moved outward in the spool shaft direction (rightward in FIG. 4). In conjunction with this, the pinion gear 32 is also moved outward in the spool shaft direction. Accordingly, the engaging pin 15a of the spool shaft 15 and the engaging grooves 32b of the pinion gear 32 are disengaged from each other. This is the clutch-off state of the clutch mechanism 19. In the clutch-off state, the rotational force from the handle shaft 30 is not transmitted to the spool 4. The spool 4 is herein freely rotatable.

When the handle 2 (i.e., the handle shaft 30) is herein rotated in the clockwise direction (the fishing line winding direction), the clutch mechanism 19 is switched from the clutch-off state to the clutch-on state.

Specifically, when the handle shaft 30 is rotated in the clockwise direction, the clutch pawl 42 is returned to the disengaged position through the ratchet wheel 72 and the toggle spring member 47. In conjunction with this, the clutch cam 40 is rotated from the decoupled position to the coupled position. Accordingly, the positioning structure 60 is disengaged. In other words, the tip end of the head part 61c of the pin member 61 is disengaged from the engaging recess 40g. In accordance with this, the tip end of the head part 61c of the pin member 61 is moved along the outer peripheral surface of the clutch cam 40 while contacting the clutch cam 40.

Additionally, the clutch mechanism 19 is herein returned from the clutch-off state to the clutch-on state. Moreover, the clutch operating member 17 is herein returned from the clutch-off position to the clutch-on position through the clutch plate 43.

Thus, in conjunction with disengagement of the positioning structure 60 and rotation of the clutch cam 40 to the coupled position, the clutch mechanism 19 is returned to the clutch-on state and the clutch operating member 17 is returned to the clutch-on position.

OTHER PREFERRED EMBODIMENTS

One preferred embodiment of the present disclosure has been explained above. However, the present disclosure is not limited to the above, and a variety of changes can be made without departing from the scope of the present disclosure.

Figure 9A:
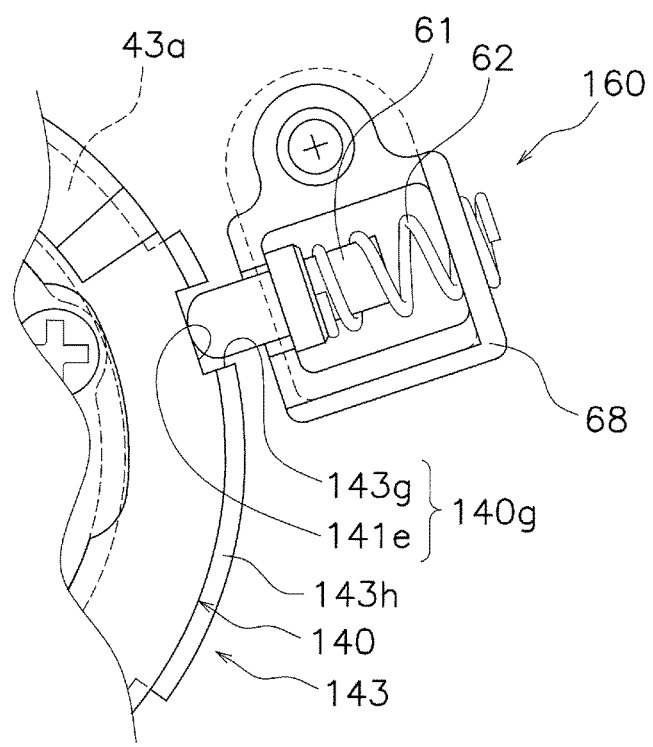
FIG. 9A is an enlarged side view of a positioning structure in a condition that a clutch cam is disposed in a decoupled position in another preferred embodiment.

(a) The aforementioned preferred embodiment has exemplified the construction that the engaging recess 40g is provided on the clutch cam 40. Alternatively, as shown in FIG. 9A, an engaging recess 140g can be composed of a clutch cam 140 and a clutch plate 143. It should be noted that in FIG. 9A, a constituent element, having a similar construction to its relevant constituent element in the aforementioned preferred embodiment, will be denoted by a reference sign assigned to the relevant constituent element.

In the other preferred embodiment (a), the clutch cam 140 is provided with a recess 141e on an outer peripheral part of the clutch cam 140. On the other hand, the clutch plate 143 further includes a brim 143h. The brim 143h is provided on the mount part 43a. The brim 143h extends in the spool shaft direction. When described in detail, the brim 143h extends in a direction separating from the reel unit 1 (e.g., a direction separating from the second side plate 8b). The brim 143h is disposed along the outer peripheral surface of the clutch cam 40. The brim 143h is provided with a cutout 143g.

The engaging recess 140g is composed of the recess 141e of the clutch cam 140 and the cutout 143g of the clutch plate 143. In other words, a positioning structure 160 is composed of the accommodation portion 68, the engaging recess 140g, the pin member 61 and the second coil spring 62. Similarly to the aforementioned preferred embodiment, the clutch cam 140 can be positioned in the decoupled position even when the positioning structure 160 is thus constructed.

Figure 9B:
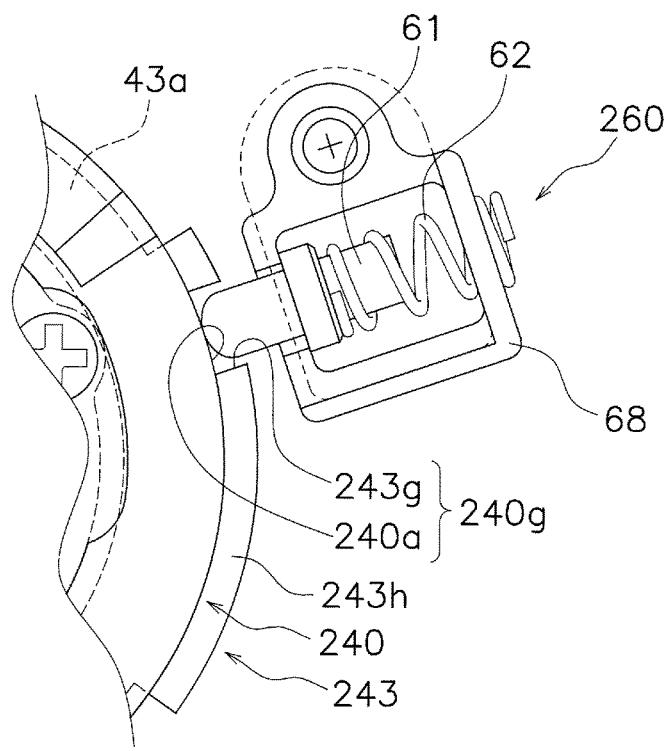
FIG. 9B is an enlarged side view of a positioning structure in a condition that a clutch cam is disposed in a decoupled position in yet another preferred embodiment.

(b) The aforementioned other preferred embodiment (a) has exemplified the construction that the engaging recess 140g is composed of the clutch cam 140 and the clutch plate 143. Alternatively, as shown in FIG. 9B, an engaging recess 240g can be composed of a clutch cam 240 and a clutch plate 243. It should be noted that in FIG. 9B, a constituent element, having a similar construction to its relevant constituent element in the aforementioned preferred embodiment, will be denoted by a reference sign assigned to the relevant constituent element.

Similarly to the aforementioned other preferred embodiment (a), the clutch plate 243 is herein provided with a brim 243h. Additionally, the brim 243h is provided with a cutout 243g. With these constructions, the engaging recess 240g is composed of an outer peripheral surface 240a of the clutch cam 240 and the cutout 243g of the clutch plate 243. In other words, a positioning structure 260 is composed of the accommodation portion 68, the engaging recess 240g, the pin member 61 and the second coil spring 62. Similarly to the aforementioned preferred embodiment, the clutch cam 240 can be positioned in the decoupled position even when the positioning structure 260 is thus constructed.

Figure 9C:
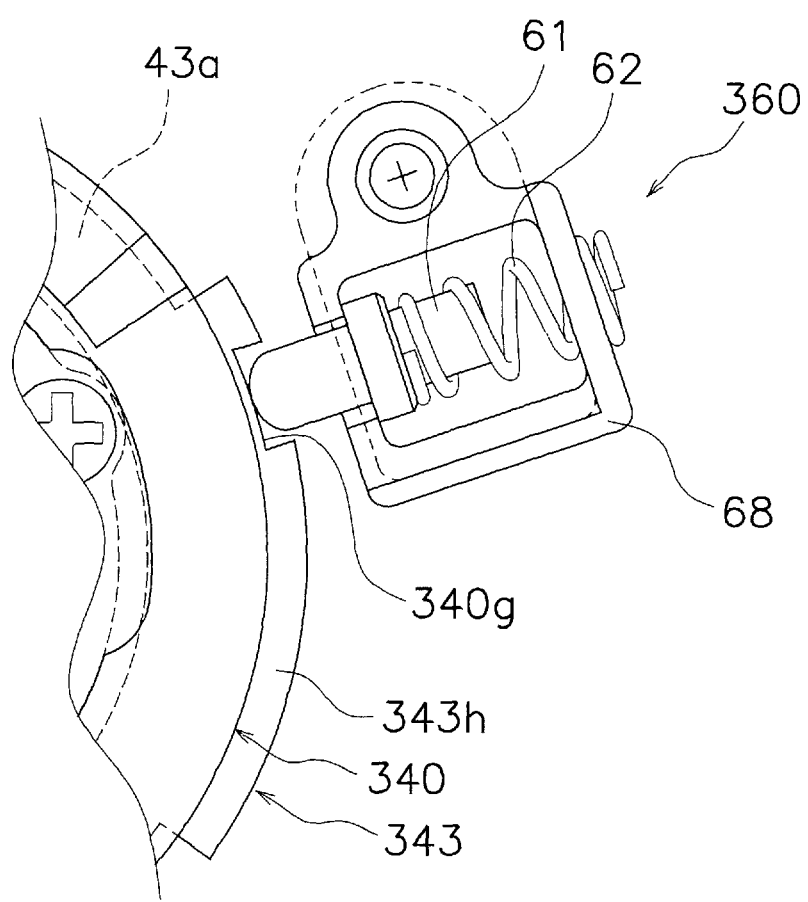
FIG. 9C is an enlarged side view of a positioning structure in a condition that a clutch cam is disposed in a decoupled position in further yet another preferred embodiment.

(c) Each of the other preferred embodiments (a) and (b) has exemplified the construction that the engaging recess 140g (240g) is composed of the clutch cam 140 (240) and the clutch plate 143 (243). Alternatively, as shown in FIG. 9C, an engaging recess 340g can be composed of only a clutch plate 343. In other words, a clutch cam 340 is not herein provided with a recess. It should be noted that in FIG. 9C, a constituent element, having a similar construction to its relevant constituent element in the aforementioned preferred embodiment, will be denoted by a reference sign assigned to the relevant constituent element.

Similarly to the aforementioned other preferred embodiments (a) and (b), the clutch plate 343 is herein provided with a brim 343h. The brim 343h is provided with the engaging recess 340g on an outer peripheral part of the brim 343h. In other words, a positioning structure 360 is composed of the accommodation portion 68, the engaging recess 340g, the pin member 61 and the second coil spring 62. Similarly to the aforementioned preferred embodiment, the clutch cam 340 can be positioned in the decoupled position even when the positioning structure 360 is thus constructed.

<Comprehensive Explanation>

The aforementioned preferred embodiments can be expressed as follows.

(1) The clutch control mechanism 20 for the present dual-bearing reel allows or blocks a transmission of the rotation of the handle 2 to the spool 4 rotatably supported by the reel unit 1 in response to either rotating the handle 2 or operating the clutch operating member 17.

The clutch control mechanism 20 includes the clutch cam 40 (140, 240, 340), the clutch plate 43 (143, 243, 343) and the positioning structure 60 (160, 260, 360). The clutch cam 40 (140, 240, 340) is mounted to the reel unit 1 so as to be rotatable between the decoupled position for blocking the transmission of the rotation of the handle 2 and the coupled position for allowing the transmission of the rotation of the handle 2. The clutch plate 43 (143, 243, 343) is coupled to the clutch operating member 17, and is coupled to the clutch cam 40 (140, 240, 340) so as to be unitarily rotatable with the clutch cam 40 (140, 240, 340). The positioning structure 60 (160, 260, 360) positions the clutch cam 40 (140, 240, 340) from outside in the radial direction about the rotational axis X of the clutch cam 40 (140, 240, 340) when the clutch cam 40 (140, 240, 340) is disposed in the decoupled position.

In the present clutch control mechanism 20, the positioning structure 60 (160, 260, 360) positions the clutch cam 40 (140, 240, 340) in the decoupled position from outside in the radial direction. Therefore, in the present clutch control mechanism 20, the clutch cam 40 (140, 240, 340) can be reliably prevented from rotating from the decoupled position to the coupled position in comparison with a well-known construction configured to position the clutch cam 40 (140, 240, 340) in the axial direction.

(2) In the clutch control mechanism 20 for the present dual-bearing reel, the positioning structure 60 (160, 260, 360) can include the engaging recess 40g (140g, 240g, 340g) and the pin member 61. The engaging recess 40g (140g, 240g, 340g) is provided on at least either of the clutch cam 40 (140, 240, 340) and the clutch plate 43 (143, 243, 343). The engaging recess 40g (140g, 240g, 340g) is opened in the radial direction. The engaging recesses 40g, 140g, 240g, and 340g are examples of position defining means for defining a rotational position of the clutch cams 40, 140, 240, and 340, respectively. The pin member 61 is provided outside the clutch cam 40 (140, 240, 340) in the radial direction. The pin member 61 engages with the engaging recess 40g (140g, 240g, 340g) when the clutch cam 40 (140, 240, 340) is disposed in the decoupled position. The pin member 61 is an example of a position holding means.

In this construction, the clutch cam 40 is positioned in the decoupled position by the positioning structure 60 (160, 260, 360) in which the pin member 61 is engaged with the engaging recess 40g (140g, 240g, 340g) from outside in the radial direction. Therefore, the clutch cam 40 (140, 240, 340) can be reliably prevented from rotating from the decoupled position to the coupled position.

(3) In the clutch control mechanism 20 for the present dual-bearing reel, the pin member 61 can be moved along the outer peripheral surface of the either of the clutch cam 40 (140, 240, 340) and the clutch plate 43 (143, 243, 343) and be engaged with the engaging recess 40g (140g, 240g, 340g) when the clutch cam 40 (140, 240, 340) is rotated from the coupled position to the decoupled position. With this configuration, the pin member 61 can be smoothly engaged with the engaging recess 40g (140g, 240g, 340g).

(4) In the clutch control mechanism 20 for the present dual-bearing reel, the part of the pin member 61 engaged with the engaging recess 40g (140g, 240g, 340g) can be the head part 61c. The pin member 61 can be disposed such that its axis P is substantially orthogonal to the rotational axis X of the clutch cam 40 (140, 240, 340). In this construction, the axis P of the pin member 61 is substantially orthogonal to the rotational axis X of the clutch cam 40 (140, 240, 340). Hence, the head part 61c of the pin member 61 can be reliably engaged with the engaging recess 40g (140g, 240g, 340g).

(5) In the clutch control mechanism 20 for the present dual-bearing reel, the positioning structure 60 (160, 260, 360) can include the second coil spring 62. The second coil spring 62 urges the pin member 61 inside in the radial direction. The second coil spring 62 is an example of an urging means. With this construction, the head part 61c of the pin member 61 can be reliably engaged with the engaging recess 40g (140g, 240g, 340g).

What is claimed is:

1. A clutch control mechanism for a dual-bearing reel, the clutch control mechanism being configured to allow or block a transmission of a rotation of a handle to a spool rotatably supported by a reel unit in response to either a rotating of the handle or an operating of a clutch operating member, the clutch control mechanism comprising:
a clutch cam rotatably mounted to the reel unit, the clutch cam rotatable between a first position and a second position, the first position blocking the transmission of the rotation of the handle, the second position allowing the transmission of the rotation of the handle;
a clutch plate coupled to the clutch operating member, the clutch plate coupled to the clutch cam and unitarily rotatable with the clutch cam; and
a positioning structure positioning the clutch cam from outside in a radial direction about a rotational axis of the clutch cam when the clutch cam is disposed in the first position.

2. The clutch control mechanism according to claim 1, wherein the positioning structure includes an engaging recess and an engaging protrusion, the engaging recess on at least either of the clutch cam and the clutch plate, the engaging recess opened in the radial direction, the engaging protrusion outside the clutch cam in the radial direction, the engaging protrusion engaged with the engaging recess when the clutch cam is disposed in the first position.

3. The clutch control mechanism according to claim 2, wherein the engaging protrusion moves along an outer peripheral surface of the either of the clutch cam and the clutch plate and engages with the engaging recess when the clutch cam is rotated from the second position to the first position.

4. The clutch control mechanism according to claim 2, wherein
the engaging protrusion is a tip end of a pin, and
the pin is disposed such that an axis of the pin is substantially orthogonal to the rotational axis.

5. The clutch control mechanism according to claim 2, wherein the positioning structure further includes an urging member, the urging member urging the engaging protrusion inside in the radial direction.

6. A clutch control mechanism for a dual-bearing reel, the clutch control mechanism to allow or block a transmission of a rotation of a handle to a spool rotatably supported by a reel unit based on a rotation of the handle or an operation of a clutch operating member, the clutch control mechanism comprising:
a clutch cam rotatably mounted to the reel unit, the clutch cam rotatable between a first position and a second position;
a clutch plate coupled to the clutch operating member, the clutch plate coupled to the clutch cam and unitarily rotatable with the clutch cam; and
a positioning structure including an engaging recess and an engaging protrusion, the engaging recess on one of the clutch cam and the clutch plate, the engaging protrusion engaging the engaging recess when the clutch cam is in the first position in a direction orthogonal to a rotational axis of the clutch cam, the engaging protrusion disengaged from the engaging recess when the clutch cam is in the second position.

7. The clutch control mechanism according to claim 6, wherein a clutch pawl is disengaged from a ratchet wheel when the clutch cam is in the first position, and
the clutch pawl is engaged with the ratchet wheel when the clutch cam is in the second position.

8. The clutch control mechanism according to claim 6, wherein the engaging recess is open in a radial direction from the rotational axis of the clutch cam, and
the engaging protrusion is farther from the rotational axis of the clutch cam in the radial direction.

9. The clutch control mechanism according to claim 8, wherein the engaging protrusion moves along an outer peripheral surface of one of the clutch cam and the clutch plate, and engages with the engaging recess when the clutch cam is rotated from the second position to the first position.

10. The clutch control mechanism according to claim 8, wherein
the engaging protrusion is a tip end of a pin, and
an axis of the pin is substantially orthogonal to the rotational axis.

11. The clutch control mechanism according to claim 8, wherein the positioning structure further includes an urging member, the urging member urging the engaging protrusion toward the clutch plate in a direction substantially orthogonal to the rotational axis of the clutch plate.

* * * * *